May 8, 1962

P. F. RECCA ETAL 3,033,925

LOOP GATE TRANSMITTER

Filed Dec. 2, 1958

2 Sheets-Sheet 1

INVENTORS

PASQUALE F. RECCA

OSCAR W. SWENSON

WILLIAM V. JOHNSON Jr.

BY

Robert H. Henderson

ATTORNEY

May 8, 1962 P. F. RECCA ET AL 3,033,925

LOOP GATE TRANSMITTER

Filed Dec. 2, 1958 2 Sheets-Sheet 2

INVENTORS
PASQUALE F. RECCA
OSCAR W. SWENSON
WILLIAM V. JOHNSON Jr.
BY Robert H. Henderson
ATTORNEY 3,033,925
LOOP GATE TRANSMITTER Pasquale Frank Recca, Bergenfield, Oscar W. Swenson, Cedar Grove, and William V. Johnson, Jr., West Orange, N.J., assignors to The Western Union Telegraph Company, New York, N.Y., a corporation of New York Filed Dec. 2, 1958, Ser. No. 777,625
12 Claims. (Cl. 178—17)

This invention relates to printing telegraph transmitting machines, and more particularly to an improvement in such machines adapted for the automatic transmission of permutation code signals from a perforated tape record.

Tape transmitters currently useful in the art, such as G. R. Benjamin's U.S. Patent 1,298,440 provide for successive sensing of transverse rows of hole positions in a paper tape by sensing pins operating after stepwise advancement of the tape, and for presentation of such character-defining information in the form of successive sets of switch closures corresponding to the existence of tape holes, as successive arrays of multi-channel electrical signals. These arrays commonly are collated by a repetitive scanning device such as a distributor for sequential transmission in a single intelligence channel.

Modern methods of central office telegraph switching require that each telegraph message be preceded by a series of coded signals indicating the destination of the message and in addition, further coded signals indicating all, or a portion of the route by which that destination is to be achieved. When such a message is first transmitted, these routing signals actuate automatic switching machinery to connect the transmitter to the desired communication channels, and since it is only after such signals have been sent that the said machinery is then actuated to connect the transmitter to the channels, these signals are lost from the message and are not contained in the message subsequently received at the destination.

It is desirable, however, to retain the transmitted message complete, without deletion of these initial instructions for record purposes, in order that the manner of message handling may be preserved for later reference. It is also desirable to so retain them in order that automatic route selection machinery in the path of the message, which is capable of diverting a message into any of the several alternative paths according to necessity of the moment, may function more efficiently through being informed of the intended destination and proposed routing of the message, thereby to avoid the setting up of any routing which is redundant or illogical.

A further reason for retaining the said signals is in order to provide information for the expeditious correction of errors in routing which may occur occasionally.

This is accomplished in the instant invention by means of a tape transmitter in which are provided means for storing a sufficient quantity of recently used tape in the form of a tape loop, and means for the repeated transmission of the characters on this tape loop upon demand, accomplished by moving the loop bodily to the tape input side of the machine. In order to form and remove the tape loop as needed, two tape drive sprockets are employed, one at the tape output side of the machine, and another (normally free wheeling during ordinary transmission), at the input side. When the former is locked and the latter operated, as occurs during transmission of address and routing information, a tape loop is formed in the loop forming gap of a member located just beyond the tape-hole sensing pins during the time that the information on the tape going into the tape loop is being transmitted. The completion of the reading of such preliminary and routing information having been indicated by the sensing of an appropriate character punched in the tape, or by other means such as counting, external devices not presently under consideration cause electrical energization of the loop gate transmitter to start the output-side tape sprocket into operation and simultaneously prevent any further feeding of the input sprocket. At the same time, a slidable shuttle having the tape loop located in a gap therein, is caused to slide along the tapeway until the entire tape loop precedes the sensing pins and is therefore in position for retransmission, which is thereupon accomplished upon the continued further feeding of the tape and sensing of the tape holes therein.

From the above general description of the function of the instant device, certain advantages are at once apparent. The transmitter is not limited in the amount of stored information which it can repeat, but can handle any amount, from a single character to the amount represented by as large a tape loop as it is convenient to accommodate. Since present application of the device indicates the need for storage of only a very moderate amount of such routing information, the tape loop is formed upwardly as a matter of convenience, in which case the stiffness of the paper tape causes it to be adequately supported, according to the present usage as to loop size. It is apparent that if a larger loop were needed, as for storing more information, a downwardly dependent loop could be employed in any size required merely by inverting the device, or otherwise by guiding the loop, and that the information storage capacity of the loop is therefore relatively unlimited. Moreover, this storage capacity is flexible, without need for any adjustment to adapt it to the exact needs of the particular message involved, although the number of characters to be stored may differ from message to message. By the use of the present invention no time is lost in transmitting blanks to fill out a storage reservoir of inflexible capacity, and a consequent improvement in message handling speed results therefrom. It is further to be noted that repetition of the stored information commences substantially instantaneously in every case, and that the time lost in backstepping the tape in order to repeat the information, as occurs in some prior devices, is therefore avoided.

Further advantages of the invention may be perceived and a clearer understanding of its operation gained from the following detailed description of a specific illustrative example of the preferred embodiment thereof, taken together with the drawings, wherein.

Figure 1:
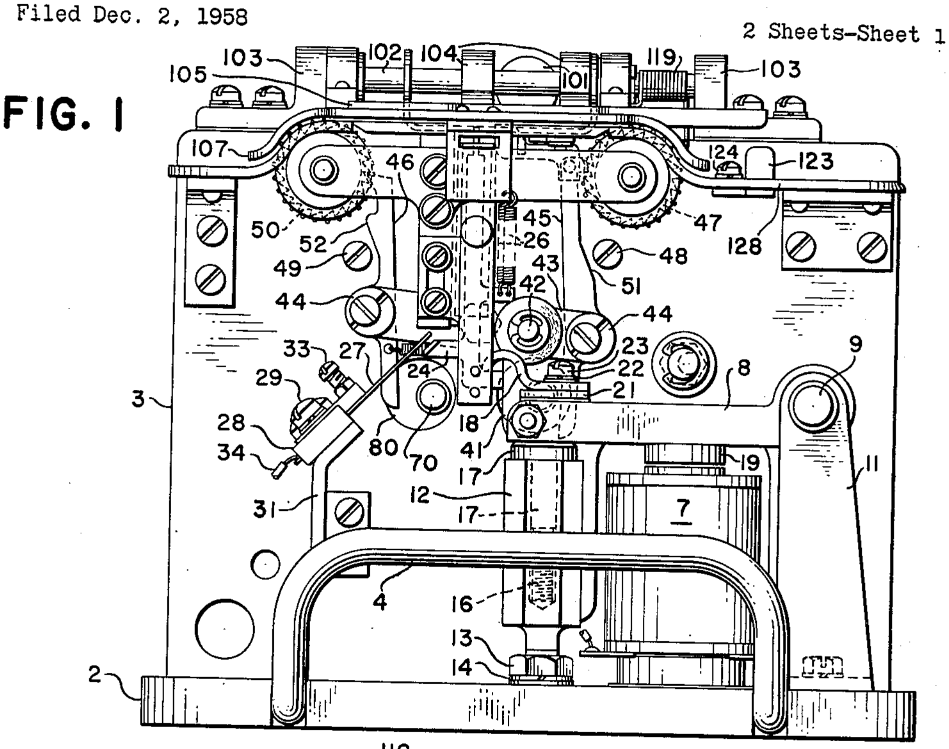
FIG. 1 is a front view of a loop gate transmitter constructed in accordance with the present invention.

Referring now to the drawings, there is seen in FIG. 1 a base 2 from which arises a vertical wall 3 and to which is fastened a handle 4 at the front thereof, and a multicontact electrical connector 6 (FIG. 3) at the rear. A stepping magnet 7 is secured to the base and provided with an attractable armature 8 which is hinged at pin 9 on the bracket 11 and provided with a stop 12 screwed into the base 2 and adjustable as to height by the jam nut 13 and lock washer 14. Stop 12 contains a recess in which is located armature return spring 16 operating on the headed plunger 17 which is preferably constructed of a resilient plastic material. Pin bail 18 is bolted to armature 8 as is polepiece 19, but is insulated from said armature by a separator 21 and by the bushings 22, all of which are made of insulating material such as phenolic laminate, the assembly being retained on armature 8 by screws such as 23. Five tapehole sensing pins, shown in enfilade at 24, have tails engaged by pin bail 18 for downwardly sliding withdrawal from said holes upon energization of stepping magnet 7. Individual return springs 26 lift each pin upon magnet deenergization into tape contact or tape hole penetration according to the condition of the tape at that point, and in the latter case a protrusion on the sensing pin touches one of a series of electrical contact blades 27 mounted in a block of insulation 28 fastened by screws such as 29 to a bracket 31 bolted to wall 3. Blades 27 are adjusted by screws 33 to produce an apropriate electrical indication in lead wires 34 fastened thereto and to connector 6 upon a tape hole being thus sensed.

Figure 2:
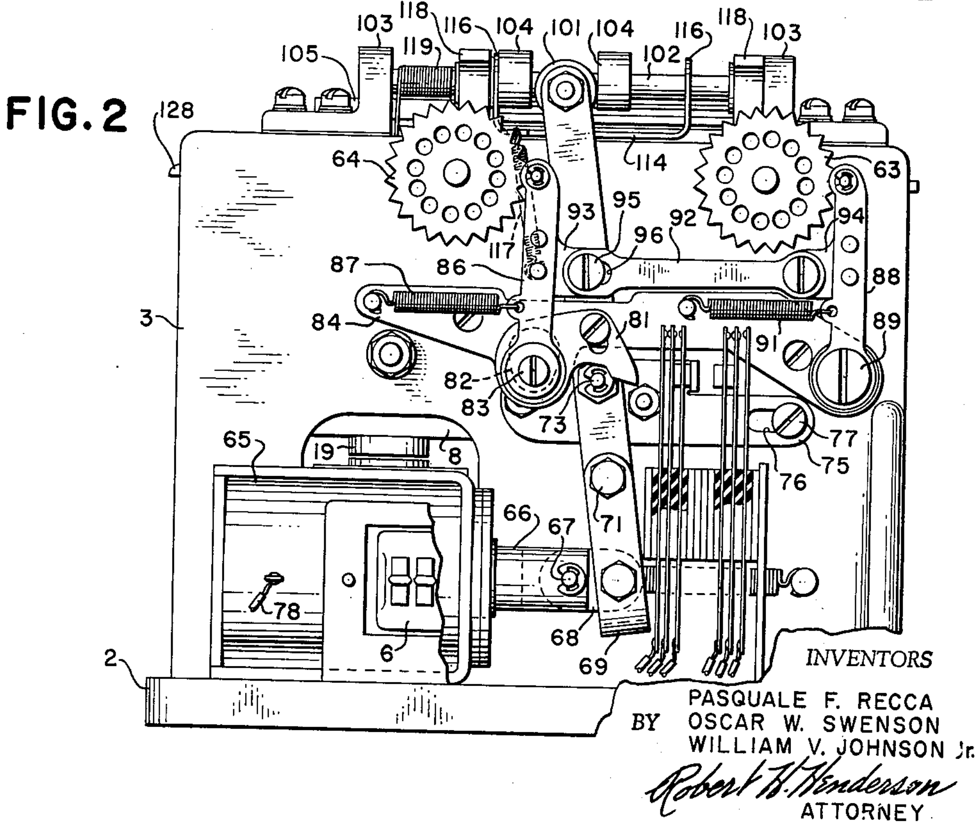
FIG. 2 is a rear view thereof.
Figure 3:
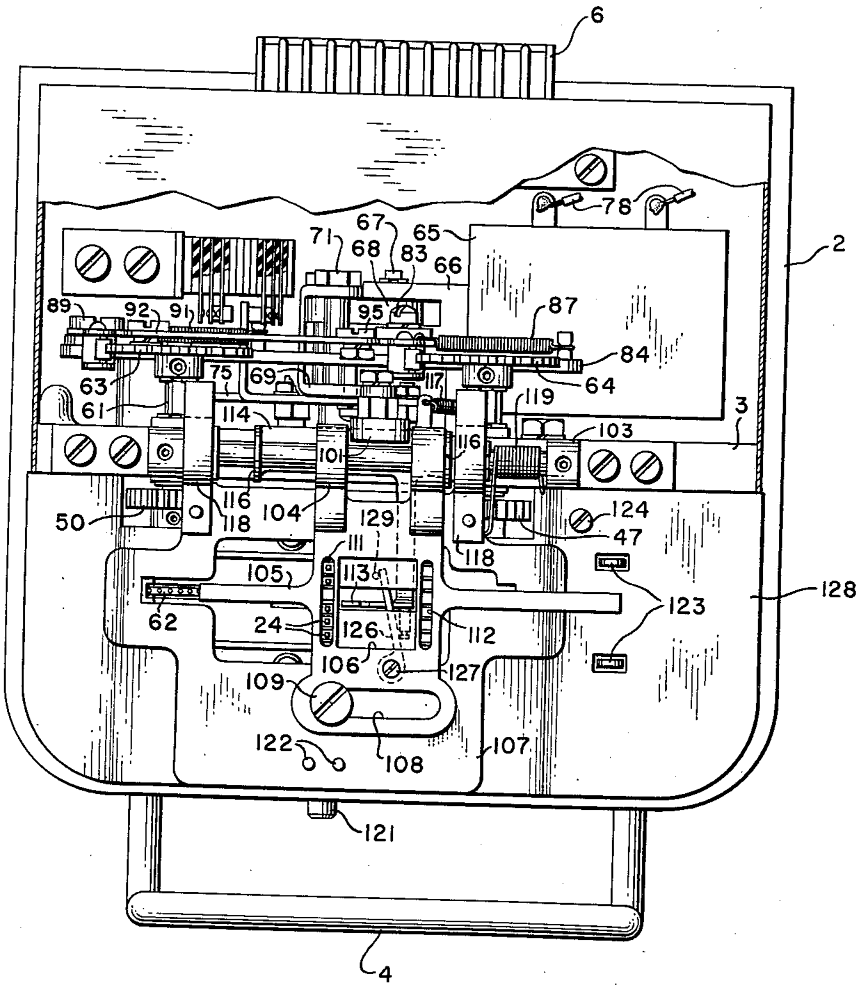
FIG. 3 is a top view thereof.

Armature 8 is also connected by the link 41 to the rocker 43 through pivot 42. Adjustable eccentric screw assemblies 44 connect rocker 43 to the pushing pawl 45 and the pulling pawl 46 which operate ratchet wheels 47 or 50 alternatively. As seen in FIG. 3, ratchet wheel 50 has an axle 61 journalled in the wall 3 and bearing also a tape feed wheel 62 and a detent star wheel 63, the latter being seen more clearly in FIG. 2, together with the detent star wheel 64 of an identical assembly associated with the ratchet wheel 47.

A solenoid 65 mounted on the base 2 has a plunger 66 fastened by pin 67 to a link 68 which in turn is pivoted to the shuttle arm 69, rotatable about shoulder screw 71 in wall 3. Shuttle arm 69 is pivoted by stud 73 to feed pawl disengagement plate 75, which is constructed with a slot 76 retained on a shoulder screw 77 in wall 3 so that energization of solenoid 65, accomplished through the wires 78, causes it to slide horizontally when the shuttle arm 69 pivots on screw 71.

A pair of disengagement rollers such as 79 (FIG. 1) are secured to the feed pawl disengagement plate 75 and protrude through holes such as 80 in wall 3 for alternative contact with and disengagement of pawls 45 or 46 according to the position they assume in accordance with the motion of shuttle arm 69. At the same time movement of arm 69 causes the above described action, the stud 73 therein engages the camming surface of swing plate 81 to rotate it counterclockwise. A circular slug 82 on the rear of swing plate 81 fits closely in a hole in plate 84 which is bolted to the wall, and acts as a journal about which plate 81 swings. Shoulder screw 83 hinges the pusher detent arm 86 to plate 81, and because of its eccentric location with respect to slug 82 is displaced slightly away from tension spring 87 when solenoid 65 is energized. Under this condition, as previously described, star wheel 64 is operative in a tape pushing function and arm 86, which is terminated in a conventional yoke and roller arrangement, bears against wheel 64 with the full pressure of spring 87 to act as a detent for accurately positioning the steps of tape advancement.

Detent arm 88 of similar construction is hinged on shoulder screw 89 into the same plate 84, and its yoke borne roller engages the tape pulling star wheel 63 at all times with the full tension of attached spring 91.

A link 92 connects the tabs 93 and 94 which are secured to arms 86 and 88 respectively, but when the assembly associated with wheel 64 is pushing tape the indexing motion of arm 86 and its shoulder screw 95 in tab 93 are lost in the slot 96, so that arm 88 is undisturbed in holding wheel 63 stationary.

When solenoid 65 is released, however, and tape feed thus transferred to the pulling assembly of wheel 63, it is essential that wheel 64 be secured from drifting or creeping during the variable period while the tape loop is being drawn off, and it is also essential that when the loop is exhausted, rotation of wheel 64 should commence without any pressure by the arm 86 against wheel 64, which could tear the feed holes out of the tape. This is accomplished when pin 73 moves into engagement with plate 81 rotating it (FIG. 2) clockwise. Screw 83 is thus moved sufficiently in the direction of spring 87 to cause shoulder screw 95 to contact the end of slot 96 and lever the yoke end of arm 86 slightly out of contact with wheel 64. Under this condition, the normal detent action of arm 88, which is then operating, is transmitted by link 92 to the arm 86, and occurs so rapidly that wheel 64 can not drift during the brief intervals while the arm is lifted, and yet is free to turn without restraint and follow the motion of wheel 63 as soon as tape tension is applied to it.

Motion of shuttle arm 69 causes the resilient disc 101 fastened to it to slide the shuttle 105 over shaft 102 retained in brackets 103 bolted to wall 3, by engagement of said disc with the collars 104 on the said shuttle.

Shuttle 105 having loop aperture 106 is shown in FIG. 3, and is seen to be slidable sideways on the cover plate 107 because of a slot 108 engaged by shoulder screw 109 in the plate 107. The tactile ends of the sensing pins 24 thus can protrude through the grating in the hole 111 or in the hole 112 of shuttle 105 according to which position the shuttle is caused to assume by shuttle arm 69.

With the solenoid 65 deenergized, shuttle 105 (FIG. 3) is at the right, and pulling feed wheel 62 is operative to feed tape in the normal manner, or to feed out the characters on any loop of tape which may have been formed through the aperture 106. When shuttle arm 69 moves shuttle 105 to the left, however, due to energization of solenoid 65, the feed wheel 62 is blocked and no longer draws tape through the machine. The tape is then fed over the sensing pins 24, however, by a pushing tape wheel (not shown) driven by ratchet wheel 47, and since aperture 106 is in this case beyond the sensing pins to the left, the tape is pushed up to form a loop after being read. When the loop forming storage function is no longer desired (as for instance if the end of an address has been reached and a special code mark in the tape indicating that fact has been automatically read and detected) solenoid 65 is denergized. Shuttle 105 returns to the position shown in FIG. 3, stripping the right hand end from, and pressing the left hand end of the tape loop onto the sensing pins, and continued operation will again read out the address or other information stored in the loop until the loop is pulled flat and normal tape reading continues.

A loop forming tape finger 113 (FIG. 3) is formed as a part of bracket 114 which can both rotate and slide on bar 102 (FIG. 2) by reason of having two upwardly turned ears 116, through holes in which the shaft 102 is inserted. Spring 117 urges the finger 113 upwardly to form a tape loop when there is no tension in the tape, but is easily depressed by slight tension in the tape when tape is being pulled through the machine.

When a tape loop is being drawn back across the sensing pins by shuttle 105, this tape finger remains extended while following the loop, however, in order to insure that the tape can not fold under the shuttle or otherwise become entangled, it is depressed by the tape only after the tape loop has been worked out.

A tape finger latch 126 (FIG. 3) is hinged on the screw 127 beneath the bed plate 128 and is resiliently urged against stop pin 129 in the bed plate. When finger 113 is depressed by tension of the tape due to normal tape feeding as a result of the pull of tape feed wheel 62, and with no tape loop, latch 126 is enabled to snap to the left against stop 129, and thus hold finger 113 depressed whether tape tension is present thereafter or not. It is thus rendered impossible for the finger to pull the tape even if the machine should "stutter" in its performance, as may rarely happen due to accidental electrical disturbances. When the shuttle is moved to the left by solenoid 65, the finger 113 slides from beneath latch 126 and is raised by tension of spring 117. Upon its return to the right, it forces latch 126 to the right, until such time as the finger is first depressed, whereupon it is again engaged by the latch.

Cover plate 107 is hinged on shaft 102 by two hinges such as 118 which have rearwardly extending tails to act as stops. Torsion spring 119 constantly urges plate 107 and the similarly hinged shuttle 105 to an upward position, which they assume when button 121 is pushed to disengage a resiliently mounted hook on which it is supported (not shown) from a conventional striker plate mounted beneath plate 107 by rivets 122. The tapeway is thus exposed for the convenient insertion of tape on feed wheels such as 62 and between prongs 123 struck upwardly from a flat piece adjustably secured beneath bed plate 128 by screw 124 and protruding upward through holes therein to form a tape guide.

Plate 107 is curved downward at the sides as seen in FIG. 1 in order to cause the tape which slides beneath it to engage a greater number of teeth on feed wheels such as 62, in order to provide better traction of the tape without danger of pulling out the feed holes in it, especially when pulling out a tape loop, and when depressing the loop-forming finger 113 by tape tension.

Although this invention has been described in terms of a specific illustrative example thereof, it is understood that various modifications and alternative details will occur to those skilled in the art, which however do not depart from the essential spirit of the invention disclosed. It is therefore intended that the invention shall be limited only by the appended claims.

What is claimed is:

1. A telegraph tape transmitter comprising retractable pins located for sensing tape holes in a tape, which moves from an input side to an output side of the transmitter, first feed wheel means disposed for pulling tape and second feed wheel means disposed for pushing tape along a tapeway, toward an output side a pair of ratchet wheel means each rigidly connected for coaxially driving one of said feed wheel means, a symmetrically disposed and reciprocable driving pawl for each said ratchet wheel, a first rigid link hingedly connecting said pawls for effecting pawl operation by transverse displacement of the link, star wheel means for and rigidly connected to each said feed wheel, similarly disposed resiliently urged detent means operative against each of said star wheel means and a second rigid link hingedly affixed to said detent means for said second feed wheel means and having a longitudinal slot slidably pinned to said detent means of said first feed wheel means, feed pawl disengagement means comprising a third and longitudinally slidable link and two rollers on said link each said roller being positioned to intercept and disengage a feed pawl at one extreme of link travel, apertured shuttle means slidable along said tapeway past said pins, solenoid means connected to said first pawl for sidewise displacement thereof and to said shuttle means for sliding displacement thereof, and to said third link, whereby solenoid operation causes tape feed to transfer from the pulling to the pushing feed wheel with full detent pressure thereon and causes the shuttle aperture to slide to the output side of the retractable pins.

2. In a telegraph tape transmitter, tape pulling feed means and further and separate tape pushing feed means, stepping magnet means for alternative connection to either of said feed means, stop means for said pulling feed means when said pushing means is connected, shuttle means having a tape loop aperture movable along a tape and over said feed means to a tape loop forming position, actuator means including output connecting means for providing bi-positional output motion and having a deenergized and an energized position, connected for moving said shuttle means to said loop forming position upon energization and for reconnecting said stepping magnet means from said pulling to said pushing feed means, and for actuating said stop means, and a loop forming tape finger mounted between said feed means, actively spring pressed into the line of tape travel while said shuttle is in loop forming position and pivotally mounted for retraction into a position of inactive withdrawal by tape tension at other times.

3. In a telegraph tape transmitter, first tape feed wheel means, detent arm means engaging said first feed wheel means, second feed wheel means located further along the line of tape travel at a predetermined distance from said first feed wheel means, sensing pins located intermediate the said feed wheels, a shuttle having an aperture for tape loop protrusion, slidable along the tape between the wheels for siding the aperture substantially completely across said sensing pins, a loop forming tape finger emergent across the path of tape travel and into the aperture at one extreme of shuttle travel and retractable at the other extreme of shuttle travel, means comprising a normally tensioned pull bar having a transverse end hole elongated for lost motion connected to said detent arm means of said first feed wheel, means for releasing the detent arm from engagement when the second feed wheel means is operating, magnet means shiftably connected to turn said feed wheels alternatively, and electrically energized shifting means operative when energized for shifting the connection of said magnet to said feed wheels and sliding said shuttle along the tape, and relaxing the tension of said pull bar.

4. A tape transmitter having a tapeway, a pawl-and-ratchet driven, detented, feed wheel assembly which engages holes in the tape, a stepping magnet for actuating said pawl, a second such feed wheel assembly spaced along said tapeway from the first, against the direction of tape travel, means comprising disengagement tails on the pawls of said assemblies, and disengagement pins operable against the said tails, and a slidable link containing the said disengagement pins whereby stepping magnet actuating power can be applied to either feed wheel alternatively by motion of said movable link, sensing pins located between said feed wheels on said tapeway, a tapeway cover having a tape loop forming aperture, slidable along said tapeway between said feed wheels for a distance to cause said aperture to pass entirely over said sensing pins in either direction, solenoid means energizable to move said slidable link and to move said tapeway cover along the tapeway, a spring actuated loop forming tape finger mounted for pushing tape through said aperture in solenoid energized position, and disabling means comprising a tension link mounted between detents for rendering the detent of said second feed wheel assembly inoperative only when said wheel is being rotated by tape tension.

5. A tape transmitter comprising tape hole sensing means, means for pushing tape forwardly across said sensing means and into a loop, means for repositioning said loop of pushed tape rearwardly into a position preceding said sensing means, further and separate means for pulling tape including said repositioned loop forwardly across said sensing means and means for actuating said sensing means to sense said tape during each forward movement thereof.

6. In a tape transmitter having a tape sensing position, primary means for advancing tape past said sensing position, means for disabling said primary tape advancing means, further and separate auxiliary means for advancing a variable length of tape past said sensing position and means independent of either of said tape advancing means for restoring said variable length of tape into position for readvancement past said sensing position.

7. In a tape transmitter having a tape sensing position, primary feed wheel means for feeding tape in one direction past said sensing position further and separate, auxiliary feed wheel means for feeding an integral portion of such tape having an adjustably predetermined length past said sensing position, detent means for locking said primary feed wheel means when said secondary feed wheel means is operative, and means for restoring said integral portion of tape to a position for refeeding across said sensing position by said primary feed wheel means.

8. In a tape transmitter having a tape sensing position, primary means for advancing tape forwardly across said sensing position further and separate, auxiliary means for advancing a variable length of tape forwardly across said sensing position, means operating to disable the operation of said primary means when said auxiliary means is operating, and shuttle means for restoring said variable length of tape into position for readvancement past said sensing position, said shuttle means being operative before the beginning of the reenabling of said primary means for operation.

9. In a tape transmitter having a tape hole sensing position for information holes punched in a tape, first intermittent tape advancement means for stepwise advancement of tape through said sensing position, electrical contact making sensing pin means located in said sensing position, tape loop forming means comprising tape restraining detent means and resilient finger means operative transversely of the tape for causing a loop of sensed tape to form beyond the sensing position, and shuttle means having a tape loop aperture and slidable along the tape for restoring said loop to a retarded position for readvancement past said sensing position and second intermittent tape advancement for readvancing said loop.

10. In a tape transmitter for the printing telegraph, a plurality of tape hole sensing fingers slidably mounted and resiliently forwardly urged individually into tape hole detecting advancement, a pushing tape feed wheel and a pulling tape feed wheel in a tapeway past said sensing pins, and a ratchet wheel and a detent star wheel axled to each said tape feed wheel, two feed pawls having disengagement tails and journaled in a reciprocable common link; each said feed pawl bearing being spring urged into respective ratchet wheel contact, a pair of spring urged detent levers each pivotally mounted for engaging a said star wheel, a cam on that said detent lever which is associated with said pushing tape feed wheel for partial detent disengagement upon cam operation during tape pulling, a link hinged at one extremity on that said detent lever which is associated with said pulling tape wheel and pinned slidably through a contained slot in the other end thereof to that said detent lever which is associated with said pushing tape wheel to indexingly lift said latter lever clear of detent wheel engagement during tape pulling detent operation, a transversely slotted tape shuttle in said tapeway, mounted for sliding axially thereof at least one slot width, and located for sensing pin traverse by said slot, a feed pawl selector slide connected for oscillation with said shuttle and having two protruding contacting portions for alternative engagement with a respective one of said feed pawl disengagement tails at each extreme of sliding, and having a portion for actuating said pushing tape wheel detent lever cam at one extreme of sliding, and a tape loop forming finger hinged without said tapeway and resiliently urged for projection thereacross, and into the slot of said shuttle, at one extreme of shuttle motion.

11. In a storage tape controlled transmitter having a plurality of tape advancing means and a single sensing station therebetween, a storage tape, a slidable member associated with said transmitter for forming a loop in said tape following the sensing of information on a selected portion thereof and means including said slidable member for automatically transferring the entire selected portion of the tape of said formed loop to a position ahead of said sensing station to enable the repeat sensing of the tape in said loop.

12. The device of claim 2 wherein said tape finger is slidably as well as pivotally mounted for movement with said shuttle means, and resiliently urged latching means mounted adjacent to said tape finger for tape finger latching in a withdrawn position only when said actuator means is in a deenergized position.

References Cited in the file of this patent

UNITED STATES PATENTS

| | | |
|---|---|---|
| 1,941,916 | Rothermel | Jan. 2, 1934 |
| 2,371,367 | Warburton | Mar. 13, 1945 |
| 2,816,161 | Glaser et al. | Dec. 10, 1957 |